June 25, 1935.　　F. R. HOHMANN　　2,006,167
SHEET GLASS FORMING APPARATUS
Filed Aug. 25, 1934　　2 Sheets-Sheet 1
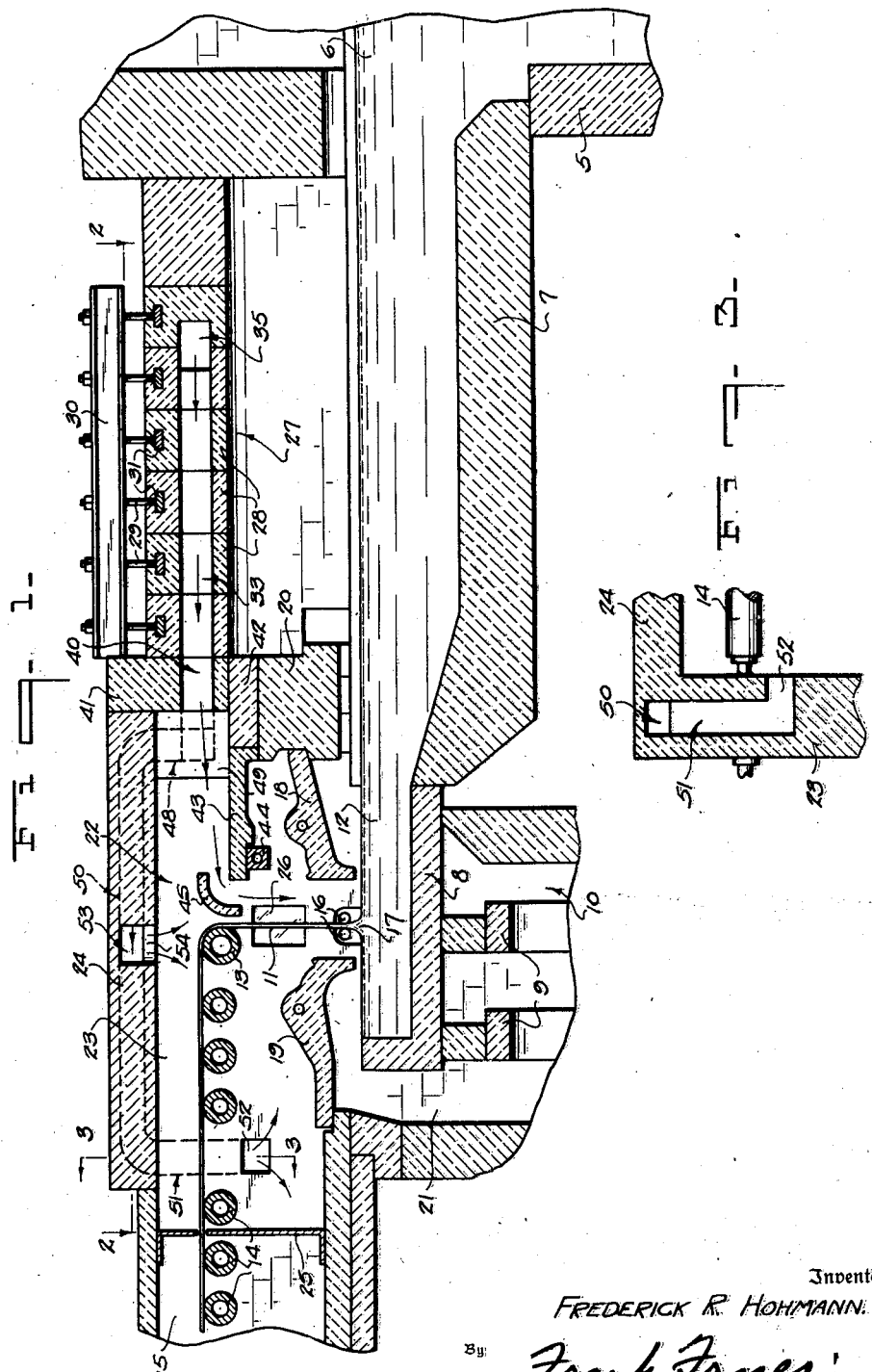
Inventor
FREDERICK R. HOHMANN.
By Frank Fraser
Attorney

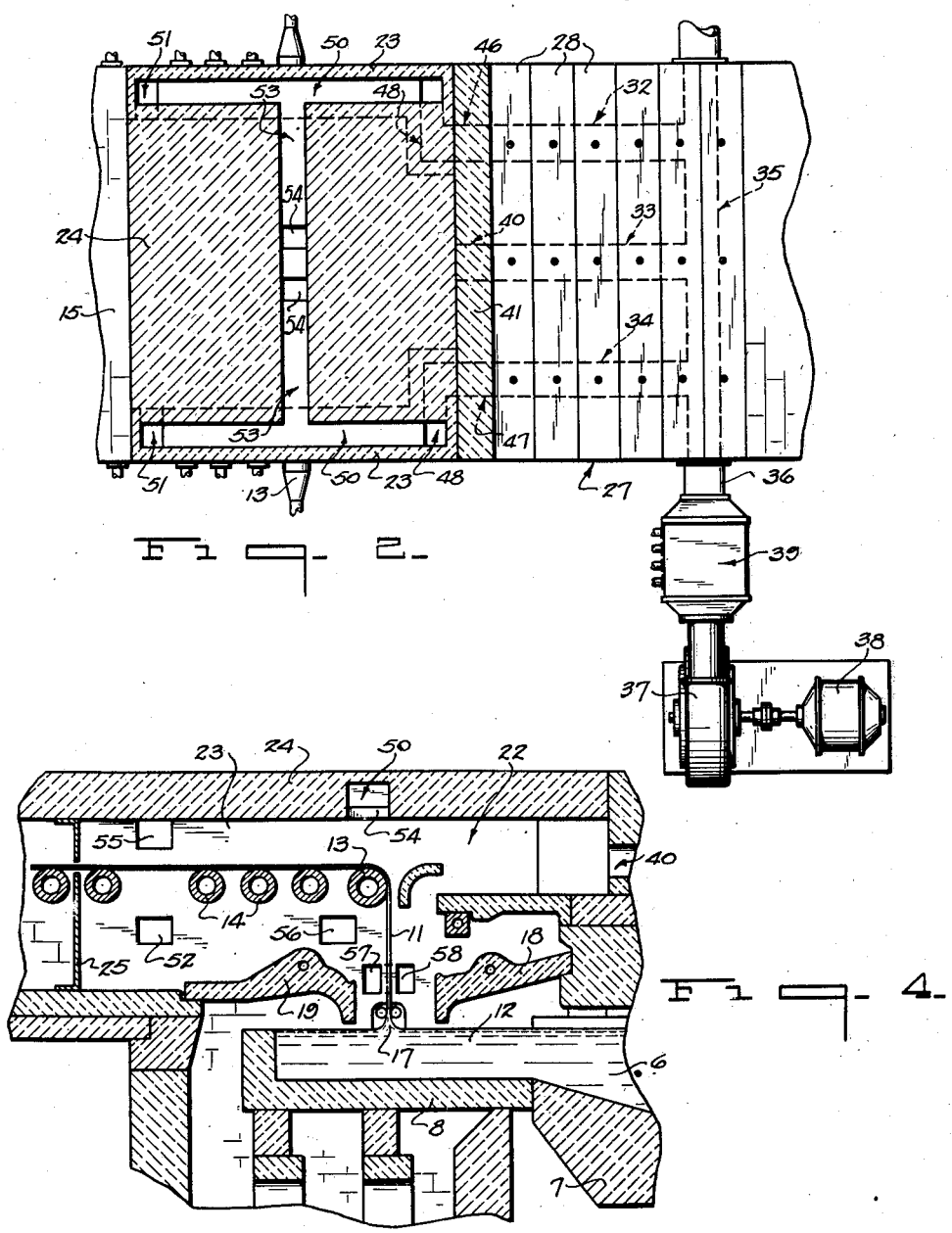

Patented June 25, 1935

2,006,167

UNITED STATES PATENT OFFICE 2,006,167

SHEET GLASS FORMING APPARATUS

Frederick R. Hohmann, Charleston, W. Va., assignor to Libbey-Owens-Ford Glass Company, Toledo, Ohio, a corporation of Ohio Application August 25, 1934, Serial No. 741,425

17 Claims. (Cl. 49—17)

The present invention relates to improvements in sheet glass forming apparatus.

More particularly, the invention has to do with the continuous formation of molten glass into flat sheet form. There are a number of different processes and machines by which molten glass can be reduced to sheet form, among which is the well known Colburn system of drawing sheet glass exemplified in Patent No. 1,248,809, granted December 4, 1917.

In the commercial exploitation of the Colburn system, a mass of molten glass is continuously produced in the melting end of a relatively long tank furnace and caused to flow slowly through the refining and cooling portions or chambers thereof into a relatively shallow working receptacle or draw-pot. A continuous sheet of glass is drawn upwardly from the surface of the pool of molten glass in the draw-pot and while still in a semi-plastic condition, although substantially set in its final sheet form, the said sheet is deflected into the horizontal plane about a rotatable bending roll and passed horizontally into and through an annealing leer.

Heretofore, when using the Colburn type of machine, it has been the usual practice to leave the opposite sides of the machine relatively open, in consequence of which the molten glass in the working receptacle as well as the sheet itself have been more or less exposed to the atmosphere. It has been found that due to the improper and undesirable circulation of air and other gases across the working receptacle and in contact with the sheet, an excessive amount of dirt, dust and other foreign matter is drawn into the interior of the machine, finding its way onto and into the sheet being formed. It will of course be understood that until the sheet has been deflected about the bending roll into the horizontal plane, it is still more or less plastic so that dirt and other foreign matter settling upon the glass will in all probability become a permanent part of the sheet. Furthermore, great care must be exercised in providing a highly polished surface to the bending roll so that the surface of the plastic sheet coming in contact therewith will not be adversely affected. Oftentimes, foreign matter moving with the glass sheet or deposited directly upon the roll will cause scratching of the latter with consequent injury to the surface of said sheet. In addition to the above, drafts or currents of air passing into the interior of the machine and coming into contact with the sheet tend to produce a so-called sheen on the surface thereof and furthermore frequently cause a slight deforming of the glass sheet itself, such deformation being in the nature of diagonal streaks or distortion in the glass.

The aim of the present invention resides in the provision of sheet glass forming apparatus so designed and constructed as to eliminate or prevent improper circulation of air and gases within the machine and about the sheet during its formative period, thereby rendering possible the formation of a sheet of improved quality as regards both cleanliness and flatness.

Another object of the invention is the provision of sheet glass forming apparatus embodying means for supplying clean heated air to the interior of the machine and around the sheet being formed in a manner to place the machine interior under partial pressure, thereby preventing outside air currents and its included dirt from passing into the machine and adversely affecting or impairing the quality of the sheet produced.

A further object of the invention is the provision of sheet glass forming apparatus embodying means for effecting the distribution of the clean heated air inside of the machine at points of vantage, resulting in a more uniform cooling and contraction of the glass sheet and reducing to a minimum diagonal distortion therein.

Other objects and advantages of the invention will become more important during the course of the following description when taken in connection with the accompanying drawings.

In the drawings wherein like numerals are employed to designate like parts throughout the same, Fig. 1 is a vertical longitudinal section through sheet glass forming apparatus constructed in accordance with the present invention, Fig. 2 is a horizontal section taken substantially on line 2—2 of Fig. 1, Fig. 3 is a vertical section taken substantially on line 3—3 of Fig. 1, and Fig. 4 is a vertical longitudinal section showing a slightly modified form of the invention.

Referring now to the drawings and particularly to Figs. 1 to 3, the numeral 5 designates specifically the refining chamber of a continuous tank furnace which is adapted to receive the mass of molten glass 6 from the melting tank (not shown) but which is located to the right in Fig. 1 as is well known in the art. The glass producing materials are introduced into the melting tank and melted therein to form the mass of molten glass 6 which then flows slowly through the said tank into the refining chamber 5 and from the refining chamber into a relatively shallower elongated cooling chamber 7 connected therewith. Associated with the forward end of the cooling chamber and adapted to receive the molten glass therefrom is the relatively shallow draw-pot or working receptacle 8 ordinarily supported upon stools 9 above a heating chamber 10.

The glass sheet 11 is drawn upwardly from the surface of the pool of molten glass 12 contained in working receptacle 8 and while still in a semi-plastic condition, although substantially set in its final sheet form, the said sheet is deflected into the horizontal plane about a rotatable bending roll 13 and carried forwardly upon a series of horizontally aligned rolls 14 into and through an annealing leer 15. As is well understood, the continuous sheet or ribbon of glass emerges from the exit end of the annealing leer onto a so-called capping table upon which it is cut transversely into sections of the desired length. These sections are then transferred to a cutting room where they are inspected for defects and cut up into smaller lights. For the purpose of maintaining the newly formed glass sheet to width, suitable width maintaining means may be provided and those here shown consist of a pair of relatively small rotatable knurled rollers 16 engaging opposite sides of the sheet at each edge thereof and closely adjacent the base or meniscus 17.

Positioned above the working receptacle 8 at opposite sides of the glass sheet 11 are lip-tiles 18 and 19 respectively which are adapted to protect the sheet in its vertical run from the heat and gases issuing from the furnace beneath the jack-arch 20 and also passing from the pot chamber 10 upwardly through the passageway 21. The lip-tiles are likewise provided to direct the heat and gases issuing from the furnace and pot chamber downwardly upon the surface of the pool of molten glass 12 to assist in controlling the temperature thereof.

All of the apparatus so far described in detail has been used in one form or another for some years and does not constitute a part of the present invention per se. The particular type of machine illustrated in the drawings is of the surface draw type in that the glass sheet is drawn from the surface of the pool of molten glass 12. The thickness of the glass sheet produced is dependent chiefly upon the viscosity of the glass in the working receptacle and the speed at which the said sheet is drawn therefrom.

As brought out above, one of the principal sources of trouble encountered in the operation of the type of sheet glass forming machine illustrated in the drawings and described above is the presence of dirt, dust and other foreign matter as well as undesirable drafts and currents of air in proximity to the sheet during its formative stage which result in an impairment of the quality thereof from the standpoint of both cleanliness and flatness. These disadvantages have been occasioned chiefly by the fact that the sheet, during its formative stage, has been more or less exposed to the atmosphere. The quality of the glass sheet being formed can be spoiled either by the settling of dirt upon the molten glass in the working receptacle; by being deposited upon the sheet while in a plastic state or by adhering to the bending roll. Likewise, drafts and undesirable air currents entering the interior of the machine and coming into contact with the sheet also results in a un-uniform cooling thereof and the formation of diagonal distortion therein.

According to the present invention, the above noted objectionable features are eliminated by the utilization of sheet glass forming apparatus of novel and improved design embodying means which will prevent or reduce to a minimum the presence of introduction of dirt, dust and other foreign matter into the interior of the machine and likewise obviate the setting up of drafts and undesirable air currents through the machine interior. Briefly stated, this is accomplished by introducing clean heated air into the interior of the machine at a plurality of points in a manner to place the interior of the machine or drawing unit under a partial pressure and thus prevent infiltration of outside air currents and its included dirt.

Arranged between the cooling chamber 7 and annealing leer 15 is the drawing chamber 22 within which the glass sheet 11 is drawn upwardly from the pool of molten glass 12 and deflected about the bending roll 13 into the horizontal plane. In the past, it has been customary for the opposite sides of this chamber to be left relatively open as a result of which the glass sheet 11 as well as the pool of molten glass 12 has been exposed to the atmosphere. In carrying out the present invention, however, the drawing chamber 22 is adapted to be substantially closed and to this end may be provided with opposite side walls 23 and a roof 24, the jack-arch 20 forming, in effect one end wall of the chamber and the baffle plate 25, separating the drawing chamber from the annealing leer, the opposite end wall, said plate having a horizontal slot therein through which the sheet passes. Thus, the machine or drawing unit is substantially enclosed. Windows 26 may be provided in the side walls 23 of the drawing chamber to permit an inspection of the glass sheet.

The cooling chamber 7 is provided with a suspended arch 27 made up of a plurality of elongated refractory blocks or sections 28 arranged side by side in contacting relationship and extending transversely of said chamber, said blocks or sections being carried by a plurality of vertical bolts 29 hung from horizontal I-beams 30 and being formed integral with or secured to metal bars 31 embedded in the blocks.

The blocks 28 are each formed with a plurality of spaced transverse openings, with the openings in adjacent blocks being arranged in alignment with one another to provide the three horizontal passageways 32, 33 and 34 extending longitudinally of the cooling chamber. These passageways communicate at their outer ends with a transverse conduit 35 through which air is adapted to be introduced and this air may be fed into the conduit from either one or both ends thereof through a pipe 36. The air is adapted to be fed into the conduit under pressure and this may be accomplished by the use of a fan or blower 37 driven from a motor 38. In addition, the air is also adapted to be washed prior to being delivered to the conduit 35 such as by passing it through a suitable washing unit 39 of any conventional construction and to which the respective pipe 36 is connected.

The central longitudinal passageway 33 communicates at its opposite or inner end with the drawing chamber 22 through an opening 40 formed in a transverse slab member 41 resting upon a tile 42 supported upon the jack-arch 20. Also supported at one end upon the jack-arch 20 is a horizontal tile 43 supported at its opposite end upon a transverse water-cooled bar 44. Positioned opposite the bending roll 13 is an arcuately curved refractory shield 45 which serves to prevent the air entering the drawing chamber through opening 40 from striking directly against the sheet, said shield acting to direct the air currents downwardly along the face of the sheet as indicated by the arrows in Fig. 1.

The transverse slab member 41 is also provided with openings 46 and 47 in registry with and forming continuations of the outer longitudinal passageways 32 and 34 respectively, each of said passageways being in communication with a duct 48 formed in a block 49 supported upon the horizontal tiles 42 and 43 and located at the corner of the drawing chamber, said duct in turn communicating with a longitudinally extending conduit 50 formed in the respective side wall 23 of the drawing chamber closely adjacent the top thereof. Each conduit 50 has a downturned outer end portion 51 which communicates with the drawing chamber 22 through an outlet 52 located beneath the horizontal run of the glass sheet 11. Leading from the conduit 50 in each side wall of the drawing chamber is a transverse passage 53 formed in the top 24 and entering the drawing chamber through an outlet 54 located substantially centrally thereof.

In the operation of the invention, clean heated air is adapted to be fed under pressure into the drawing chamber 22, with the pressure of the air within said chamber being such as to offset any tendency of air to move from the outside of the machine into the interior thereof. This air is forced into the conduit 35 at one or both ends by the fan or blower 37, being washed and cleaned during its passage through the washing unit 39. The air then flows longitudinally through the passageways 32, 33 and 34 into the drawing chamber, the air from passageway 33 entering the drawing chamber through opening 40 while the air from passageways 32 and 34 enters said chamber through the outlets 52 and 54 in the opposite side walls 23 and top 24 respectively thereof. As the air flows through the passageways 32, 33 and 34, it will of course be heated by contact with the heated walls thereof so that upon entering the drawing chamber, the air will be of a desired substantially predetermined temperature.

The feeding of clean heated air into the interior of the machine or, in other words, into the drawing chamber at a plurality of points as shown, will result in a more uniform cooling of the glass sheet with consequent uniform contraction thereof. Furthermore, since the machine interior or drawing chamber would be under partial pressure, outside air currents and its included dirt are prevented from passing into the machine and coming into contact with or settling upon the glass sheet 11, pool of molten glass 12 and bending roll 13. Also, by so controlling the movement of air within the drawing chamber, there will be no turbulence in and around the glass sheet, with the result that the objectionable diagonal streaks and distortion heretofore caused in the sheet by the infiltration of outside air and drafts will be obviated.

The closing up of the sides of the drawing chamber 22 assists materially in accomplishing those objects set forth hereinabove and, in fact, the more the sides of the machine are enclosed the more effective the present invention. However, it is almost impossible from a mechanical standpoint to thoroughly and tightly enclose the drawing chamber. For instance, certain openings have to be provided in the side walls of the chamber to permit the installation and removal of the knurled rolls 16 and also to permit the use of burners, hooks, ladles and the like when desired. Also, some trouble is ordinarily encountered in the passage of heated air and gases beneath the lip-tiles 18 and 19. Therefore, the air pressure built up within the drawing chamber must be sufficient to prevent the infiltration of outside air currents at these and other points.

Heretofore, it has been customary to provide so-called sheet coolers in the form of internally cooled rectangular metal casings at opposite sides of the sheet 11 closely adjacent the pool of molten glass 12 to shield the sheet from heated air currents passing beneath the lip-tiles. However, according to the present invention, these sheet coolers may be eliminated, since the pressure of air within the drawing chamber will tend to offset the passage of heated air and gases beneath the lip-tiles.

While the invention has been described hereinabove and illustrated in the drawings in connection with a single sheet forming machine, yet it will be apparent that the same or a similar construction and arrangement can be successfully employed with a so-called double tank furnace or, in other words, with two machines which are supplied with molten glass from a single melting tank. In a double tank furnace, the working receptacles are positioned opposite one another and it has been found that the space between adjacent receptacles or machines creates what is in effect a stack. This results in a flow of air from the outside of the two machines across the glass in the working receptacles, and it has been found that due to this improper and undesirable circulation of air across the working receptacles and in contact with the sheets, an excessive amount of dirt finds its way onto and into the glass. Also, such outside air currents entering the machine tend to cause diagonal distortion in the glass sheets. With the present arrangement associated with each machine, however, this cross flow of air would be eliminated and the movement of the air within the machines so controlled as to prevent the entrance of dirt as well as undesirable air currents therein.

As brought out above, the clean heated air is adapted to be introduced into the drawing chamber at a plurality of points and the invention is of course not restricted to the introduction of the air at any specific locations, the number and position of the air outlets being dependent upon particular operating conditions. Thus, upon reference to Fig. 4, it will be seen that the air, in addition to being introduced into the drawing chamber 22 through the outlets 40, 52 and 54 as in Fig. 1, can also be introduced through an outlet 55 located above the sheet, an outlet 56 beneath the bending roll 13 and outlets 57 and 58 at opposite sides of the sheet at a point near the meniscus 17. The introduction of the air through these outlets is accomplished by a suitable arrangement of conduits and passages leading from the passageways 32, and 34 formed in the arch of the cooling chamber 7.

It is to be understood that the form of the invention herewith shown and described is to be taken as the preferred embodiment of the same, and that various changes in the shape, size and arrangement of parts may be resorted to with-

I claim:

1. In sheet glass apparatus, a receptacle containing a mass of molten glass, a sheet forming machine including means for drawing a sheet upwardly from the molten glass in said receptacle, a tank for supplying molten glass to the receptacle, one wall of said tank having a passageway formed therein, means for feeding air into the passageway at one end thereof, and means for receiving the air from the opposite end of said passageway and discharging it into the interior of the sheet forming machine in proximity to the sheet being drawn.

2. In sheet glass apparatus, a receptacle containing a mass of molten glass, a sheet forming machine including means for drawing a sheet upwardly from the molten glass in said receptacle, a tank for supplying molten glass to the receptacle, one wall of said tank having a plurality of passageways formed therein, means for feeding air under pressure into the passageways at one end thereof, and means for receiving the air from the opposite end of said passageways and discharging it into the interior of the sheet forming machine at a plurality of points in proximity to the sheet being drawn.

3. In sheet glass apparatus, a receptacle containing a mass of molten glass, a sheet forming machine including means for drawing a sheet upwardly from the molten glass in said receptacle, a tank for supplying molten glass to the receptacle, one wall of said tank having a passageway formed therein, means for feeding air into the passageway at one end thereof, means for cleaning the air prior to its introduction into the passageway, and means for receiving the air from the opposite end of said passageway and discharging it into the interior of the sheet forming machine in proximity to the sheet being drawn.

4. In sheet glass apparatus, a receptacle containing a mass of molten glass, a sheet forming machine including means for drawing a sheet upwardly from the molten glass in said receptacle, a tank for supplying molten glass to the receptacle, one wall of said tank having a plurality of passageways formed therein, means for feeding air under pressure into the passageways at one end thereof, means for cleaning the air prior to its introduction into the passageways, and means for receiving the air from the opposite end of said passageways and discharging it into the interior of the sheet forming machine at a plurality of points in proximity to the sheet being drawn.

5. In sheet glass apparatus, a receptacle containing a mass of molten glass, a sheet forming machine including means for drawing a sheet upwardly from the molten glass in said receptacle, a furnace for supplying molten glass to the receptacle and embodying a cooling chamber connected with said receptacle, the top wall of said cooling chamber having a passageway formed therein and extending longitudinally thereof, means for feeding air into the passageway at one end thereof, and means for receiving the air from the opposite end of said passageway and discharging it into the interior of the sheet forming machine in proximty to the sheet being drawn.

6. In sheet glass apparatus, a receptacle containing a mass of molten glass, a sheet forming machine including means for drawing a sheet upwardly from the molten glass in said receptacle, a furnace for supplying molten glass to the receptacle and embodying a cooling chamber connected with said receptacle, the top wall of said cooling chamber having a plurality of passageways formed therein and extending longitudinally thereof, means for feeding air under pressure into the passageways at one end thereof, and means for receiving the air from the opposite end of said passageways and discharging it into the interior of the sheet forming machine at a plurality of points in proximity to the sheet being drawn.

7. In sheet glass apparatus, a receptacle containing a mass of molten glass, a sheet forming machine including means for drawing a sheet upwardly from the molten glass in said receptacle, a furnace for supplying molten glass to the receptacle and embodying a cooling chamber connected with said receptacle, the top wall of said cooling chamber having a plurality of passageways formed therein and extending longitudinally thereof, means for feeding air under pressure into the passageways at one end thereof, means for cleaning the air prior to its introduction into the passageways, and conduits for receiving the air from the opposite end of said passageways and discharging it into the interior of the sheet forming machine at a plurality of points in proximity to the sheet being drawn.

8. In sheet glass apparatus, a receptacle containing a mass of molten glass, a sheet forming machine including means for drawing a sheet upwardly from the molten glass in said receptacle, a tank for supplying molten glass to the receptacle, one wall of said tank having a passageway formed therein, and means for feeding air into the passageway at one end thereof, the opposite end of said passageway opening into the interior of the sheet forming machine in proximity to the sheet being drawn.

9. In sheet glass apparatus, a receptacle containing a mass of molten glass, a sheet forming machine including means for drawing a sheet upwardly from the molten glass in said receptacle, a tank for supplying molten glass to the receptacle, one wall of said tank having a plurality of passageways formed therein, means for feeding air under pressure into the passageways at one end thereof, one of said passageways opening at its opposite end into the interior of the sheet forming machine, and means for receiving the air from other of said passageways and discharging it into opposite sides of the sheet forming machine in proximity to the sheet being drawn.

10. In sheet glass apparatus, a receptacle containing a mass of molten glass, a sheet forming machine including means for drawing a sheet upwardly from the molten glass in said receptacle, a furnace for supplying molten glass to the receptacle and embodying a cooling chamber connected with said receptacle, the top wall of said cooling chamber having a plurality of passageways formed therein and extending longitudinally thereof, means for feeding air under pressure into the passageways at one end thereof, one of said passageways opening at its opposite end into the interior of the sheet forming machine, and conduits for receiving the air from other of said passageways and discharging it into opposite sides of the sheet forming machine in proximity to the sheet being drawn.

11. In sheet glass apparatus, a receptacle containing a mass of molten glass, means for drawing a sheet upwardly therefrom, means for deflecting the sheet from the vertical into the horizontal plane, means forming a drawing chamber above said receptacle in surrounding relation to said sheet, a tank for supplying molten glass to the receptacle, one wall of said tank having a passageway formed therein, means for feeding air into the passageway at one end thereof, and means for receiving the air from the opposite end of said passageway and discharging it into the said drawing chamber.

12. In sheet glass apparatus, a receptacle containing a mass of molten glass, means for drawing a sheet upwardly therefrom, means for deflecting the sheet from the vertical into the horizontal plane, means forming a drawing chamber above said receptacle in surrounding relation to said sheet, a tank for supplying molten glass to the receptacle, one wall of said tank having a passageway formed therein, and means for feeding air under pressure into the passageway at one end thereof, said passageway opening at its opposite end into the said drawing chamber.

13. In sheet glass apparatus, a receptacle containing a mass of molten glass, means for drawing a sheet upwardly therefrom, means for deflecting the sheet from the vertical into the horizontal plane, means forming a drawing chamber above said receptacle in surrounding relation to said sheet, a tank for supplying molten glass to the receptacle, one wall of said tank having a plurality of passageways formed therein, means for feeding air under pressure into the passageways at one end thereof, and means for receiving the air from the opposite end of said passageways and discharging it into the drawing chamber at a plurality of points.

14. In sheet glass apparatus, a receptacle containing a mass of molten glass, means for drawing a sheet upwardly therefrom, means for deflecting the sheet from the vertical into the horizontal plane, means forming a drawing chamber above said receptacle in surrounding relation said said sheet, a tank for supplying molten glass to the receptacle, one wall of said tank having a plurality of passageways formed therein, means for feeding air under pressure into the passageways at one end thereof, one of said passageways opening at its opposite end into the drawing chamber, and conduits for receiving the air from other of said passageways and discharging it into the drawing chamber at a plurality of points.

15. In sheet glass apparatus, a receptacle containing a mass of molten glass, means for drawing a sheet upwardly therefrom, means for deflecting the sheet from the vertical into the horizontal plane, means forming a drawing chamber above said receptacle in surrounding relation to said sheet, a furnace for supplying molten glass to the receptacle and embodying a cooling chamber connected with said receptacle, the top wall of said cooling chamber having a passageway formed therein extending longitudinally thereof, means for feeding air into the passageway at one end thereof, and means for receiving the air from the opposite end of said passageway and discharging it into the said drawing chamber.

16. In sheet glass apparatus, a receptacle containing a mass of molten glass, means for drawing a sheet upwardly therefrom, means for deflecting the sheet from the vertical into the horizontal plane, means forming a drawing chamber above said receptacle in surrounding relation to said sheet, a furnace for supplying molten glass to the receptacle and embodying a cooling chamber connected with said receptacle, the top wall of said cooling chamber having a plurality of passageways formed therein extending longitudinally thereof, means for feeding air under pressure into the passageways at one end thereof, and means for receiving the air from the opposite end of said passageways and discharging it into the said drawing chamber at a plurality of points.

17. In sheet glass apparatus, a receptacle containing a mass of molten glass, means for drawing a sheet upwardly therefrom, means for deflecting the sheet from the vertical into the horizontal plane, means forming a drawing chamber above said receptacle in surrounding relation to said sheet, a furnace for supplying molten glass to the receptacle and embodying a cooling chamber connected with said receptacle, the top wall of said cooling chamber having a plurality of passageways formed therein extending longitudinally thereof, means for feeding air under pressure into the passageways at one end thereof, means for cleaning the air prior to its introduction into the passageways, and conduits for receiving the air from the opposite end of said passageways and discharging it into the said drawing chamber at a plurality of points.

FREDERICK R. HOHMANN.